(12) United States Patent
Tzeng (10) Patent No.: US 12,490,361 B2
(45) Date of Patent: Dec. 2, 2025

(54) METHODS AND SYSTEMS FOR MANAGING LIGHTING ON A TRANSPORTATION VEHICLE

(71) Applicant: Panasonic Avionics Corporation, Irvine, CA (US)

(72) Inventor: Henry Zoon-Hu Tzeng, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 317 days.

(21) Appl. No.: 18/228,343

(22) Filed: Jul. 31, 2023

(65) Prior Publication Data

US 2025/0048518 A1 Feb. 6, 2025

(51) Int. Cl.
*H05B 47/11* (2020.01)
*B60N 2/90* (2018.01)
*B64D 11/00* (2006.01)

(52) U.S. Cl.
CPC .............. *H05B 47/11* (2020.01); *B60N 2/90* (2018.02); *B64D 11/00* (2013.01); *B64D 2011/0038* (2013.01)

(58) Field of Classification Search
CPC .......... H05B 47/11; B60N 2/90; B64D 11/00; B64D 2011/0038; B64D 2011/0015
See application file for complete search history.

(56) References Cited

U.S. PATENT DOCUMENTS

| | | | | |
|---|---|---|---|---|
| 2023/0028136 A1* | 1/2023 | Lee | ...................... | H05B 47/105 |
| 2024/0224399 A1* | 7/2024 | Gomm | ................... | H05B 47/19 |

FOREIGN PATENT DOCUMENTS

WO  WO-2023086457 A1 *  5/2023  ............. H05B 47/11

OTHER PUBLICATIONS

Finio; "Science with a Smartphone: Measure Light with Lux"; Scientific American; Oct. 3, 2019; https://www.scientificamerican.com/article/science-with-a-smartphone-measure-light-with-lux/; Printed on Jul. 18, 2023.

Hakimi; "Lumens Calculator: How to Determine Total Required Lumens for Your Space"; Insights by Alcon Lighting; Sep. 23, 2022; https://www.alconlighting.com/blog/residential-led-lighting/how-do-i-determine-how-many-led-lumens-i-need-for-a-space/#:~:text=Multiply%20the%20room%20square%20footage,candles%2C%20will%20require%204%2C000%20lumens; Printed on Jul. 18, 2023.

* cited by examiner

*Primary Examiner* — Alexander H Taningco
*Assistant Examiner* — Pedro C Fernandez
(74) *Attorney, Agent, or Firm* — LOZA & LOZA, LLP (57) ABSTRACT

Methods and systems are provided for a transportation vehicle. One method includes computing an average of light sensor data of a first group of seat devices; comparing the computed average with a previous average of the first group and at least a second group; determining that the computed average of the light sensor data of the first group is different from the previous average by a threshold value; identifying a change in an ambient light condition based on a difference between the computed average and the previous average of the light sensor data of the first group and comparison of the computed average with the average of the light sensor data of the second group; and automatically adjusting a brightness level of the seat devices of the first group, in response to the change in the ambient light condition.

20 Claims, 10 Drawing Sheets

METHODS AND SYSTEMS FOR MANAGING LIGHTING ON A TRANSPORTATION VEHICLE

TECHNICAL FIELD

The present disclosure relates to transportation vehicles in general, and more particularly, to technology for managing lighting on a transportation vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Typically, during a flight, aircraft cabin lights are dimmed to simulate night conditions to help on-board passengers to adjust to their final destination time-zones. Conventional lighting management on an aircraft is typically operated independent of an on-board IFE system. Conventional aircraft lighting systems often fail to create a cohesive ambience light between interior cabin lighting, in-seat lighting, and IFE display lighting. Continuous efforts are being made to develop technologies that improve passenger experience by better lighting management on aircraft and other transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

In one aspect, innovative technology is disclosed for integrating light sensors of display devices with entertainment systems on transportation vehicles, including aircraft, ships, trains, busses and other vehicle types. The examples illustrating innovative technology are based on aircraft but can be implemented on other vehicle types.

In one aspect, innovative technology is disclosed to determine an aircraft's cabin lighting conditions using an Inflight Entertainment System's (IFE's) seat device (or monitor) light sensors. This is useful for both crew members and passengers because it enables centralized control for cabin light, reduces light disruption to passengers' and may also help to reduce passenger eye strain by automatically reducing/increasing brightness level of seat devices based on cabin light. This also removes a static schedule/manual light control methodology that is used by conventional systems, prior to this disclosure.

In one aspect, the technology disclosed herein uses a group of light sensors located on IFE devices to determine cumulative light that is being emitted near the light sensors (e.g., in lumens) and light intensity levels (e.g., in candelas). Based on the measured data, in real time, a current ambience light condition in the aircraft cabin is determined. Instead of using a single light sensor, the technology disclosed herein uses data from a group of monitors with built-in light sensors.

In one aspect, one or more light sensors from each monitor periodically report sensor data (e.g., flux and intensity data). A light control module maintains a running average of each seat device's light sensor data. The light control module determines a group's average light sensor data and compares the average against a previous duration (e.g., without limitation, 10 seconds earlier). If value has increased beyond or equal to a first threshold level, then an increase is noted. If value has decreased, compared to a second threshold value, then a decrease is noted. The increased or decreased value is compared with other groups average light sensor data. If X number (e.g., 3) consecutive groups report the same changes, then the change is captured and noted to indicate the state of the ambient light. The decrease indicates a low light ambience mode, while the increase indicates a high light ambience mode. Based on the ambient light condition, the light control module determines a "Bright/daytime," "Dark/nighttime" or another light condition. Based on the light condition a command is sent to each seat device within one or more groups to adjust their brightness level. Details regarding the innovative technology are provided below.

As a preliminary note, the terms "component", "module", "system", and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
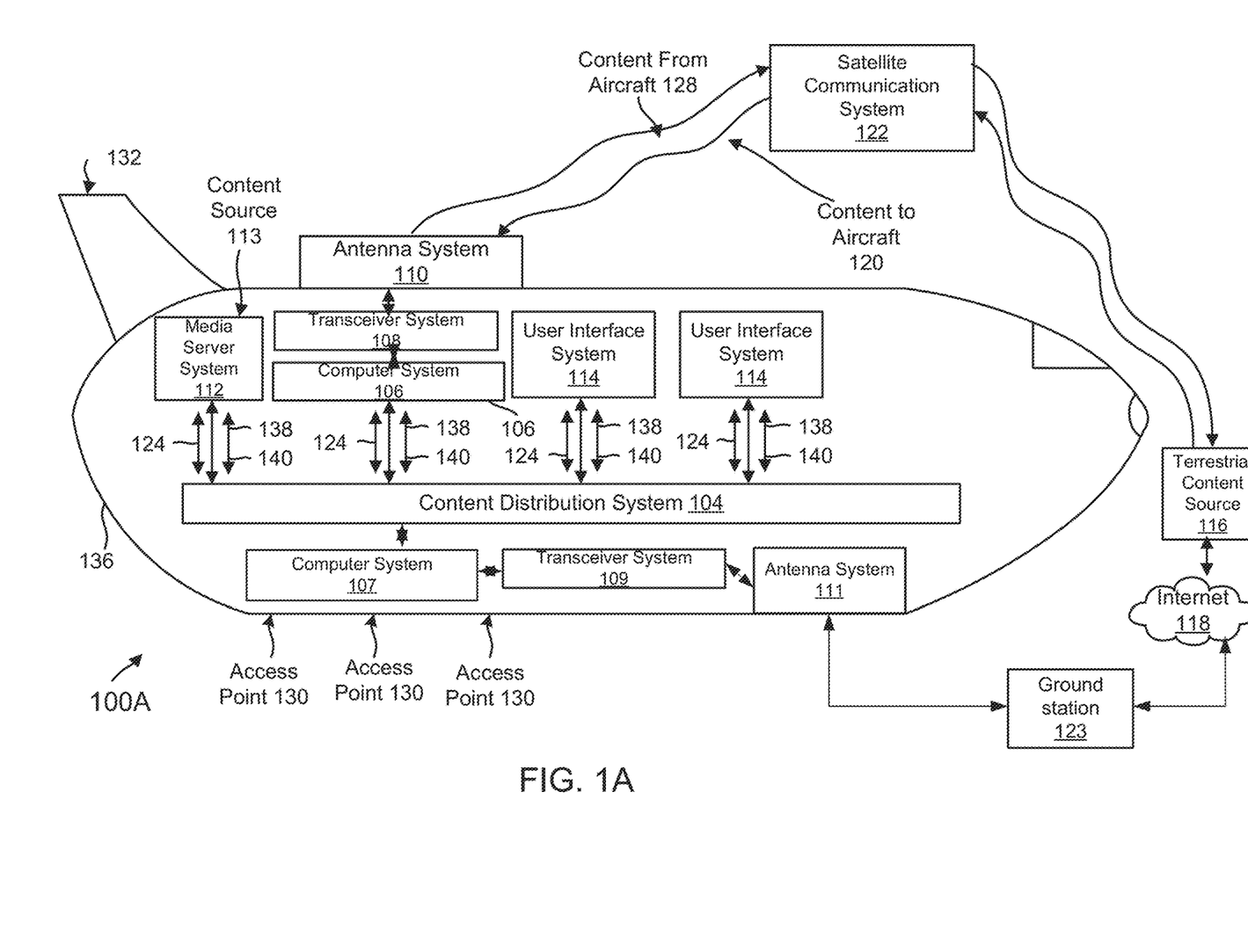
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, California, the assignee of this application.

Figure 3A:
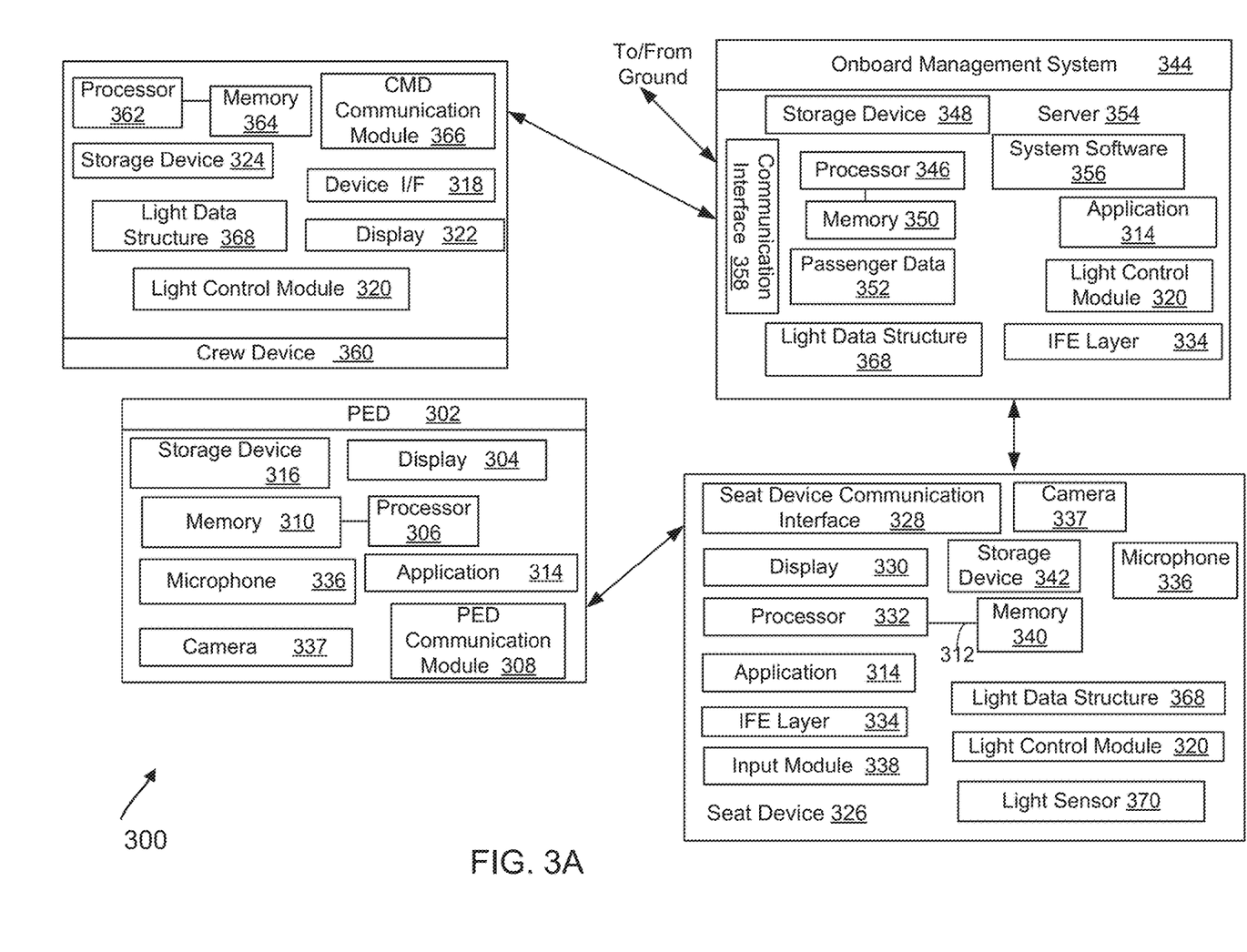
FIG. 3A shows an example of a system for managing a plurality of light sensors used by an IFE system of an aircraft, according to one aspect of the present disclosure.

System 100A may include one or more content source 113 and one or more user (or passenger) interface systems (may also be referred to as a seat device/seatback device/IFE device 326 described below with respect to FIG. 3A) 114 that communicate with a real-time content distribution system 104.

As an example, the content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing preprogrammed content and/or downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, terrestrial content source 116 can be configured to communicate with other terrestrial content sources (not shown). Terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The display device may have one or more light sensors that detect ambient light within the cabin and near each passenger seat. Information from a group of sensors is used to adjust user interface 114 brightness level, as described below in detail.

The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via a wireless access point 130. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
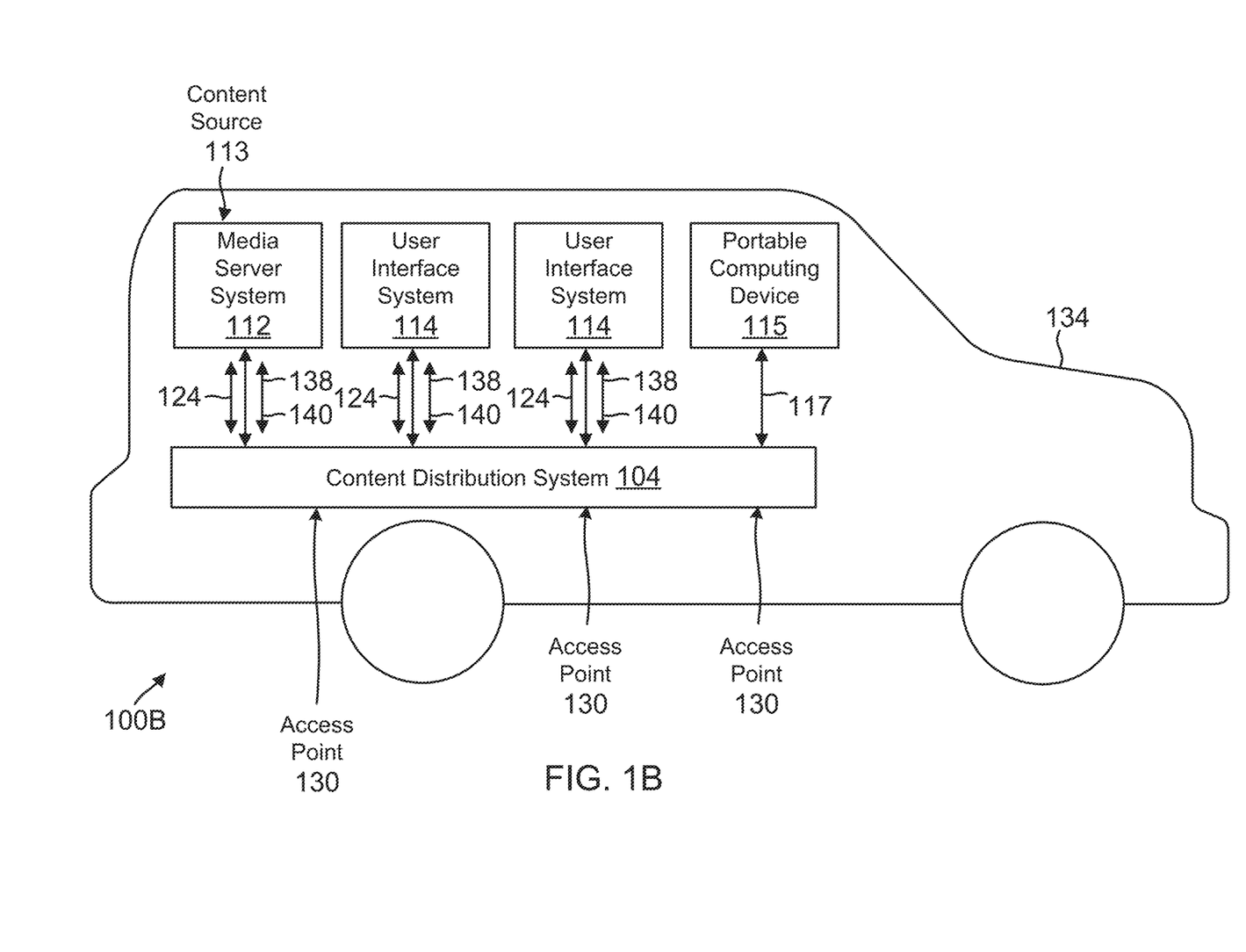
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Figure 2:
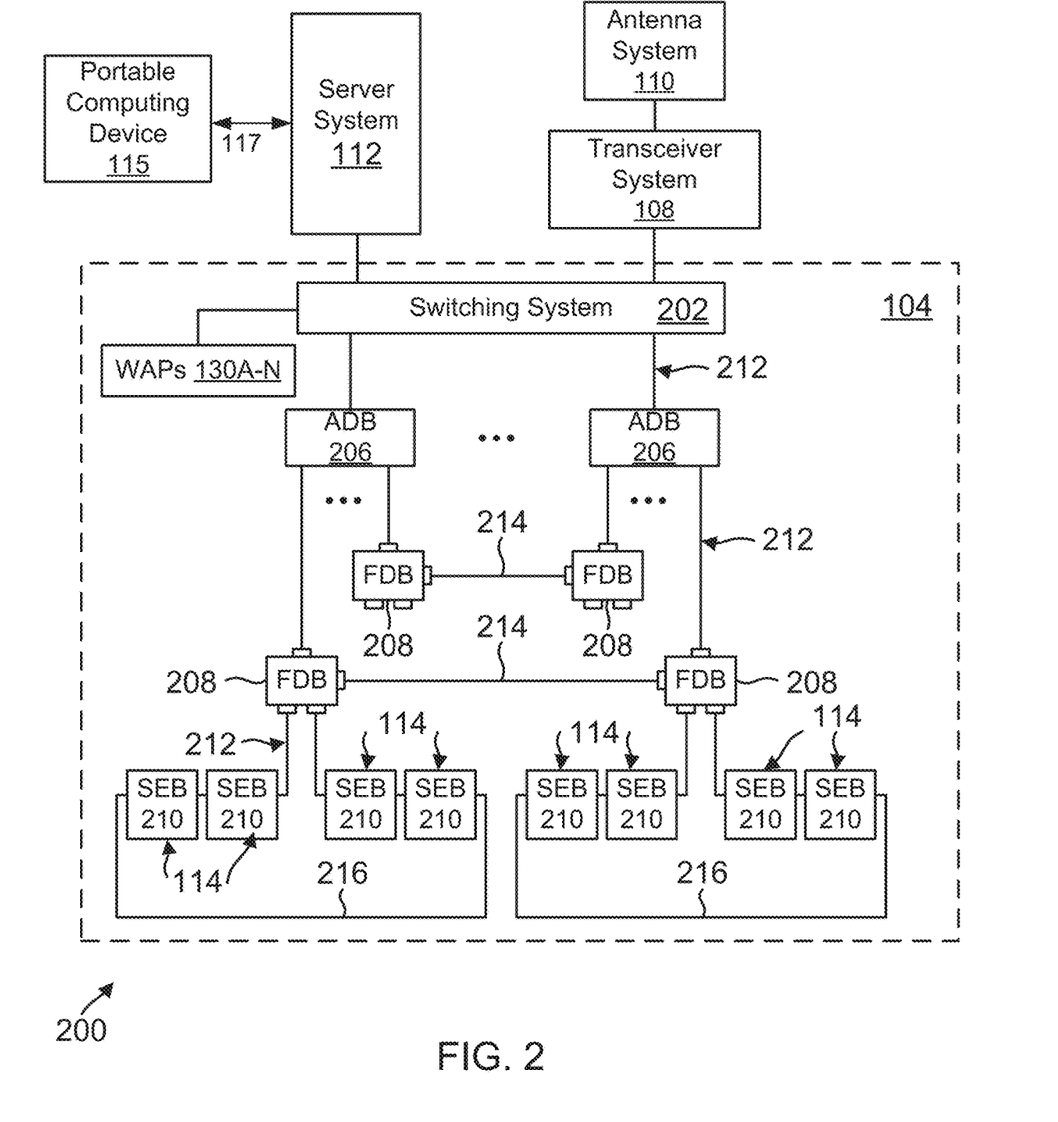
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114. The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

Distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

System 300: FIG. 3A shows an example of a system 300 configured to operate within an aircraft system (e.g., an onboard management system 344 executing an IFE layer, may also be referred to as the IFE system), according to one aspect of the present disclosure.

In one aspect, system 300 includes an onboard management system 344, a seat device 326, a PED 302, when authorized, and a crew device (may be referred to as "CMD") 360, when authorized. In yet another aspect, system 300 includes the CMD 360 and the PED 302 or the CMD 360 and the seat device 326, respectively.

In one aspect, the onboard management system 344 includes a server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, a lighting data structure 368 (may also be referred to as data structure 368), a light control module 320 (may also be referred to as module 320), applications and program files, including system software 356, application 314, and others. It is noteworthy that the light control module 320 may also be executed at the seat device 326, CMD 360 or any other computing device. Details regarding data structure 368 and the light control module 320 are provided below.

In one aspect, system software 356 is executed by processor 346 to control the overall operation of the server 354. Application 314 may be downloaded from server 354 by passengers using an authorized PED 302 paired with the seat device 326 and/or server 354 for accessing digital content.

In one aspect, the onboard management system 344 maintains flight and passenger data 352 (may also be referred to as data 352), for example, flight itinerary including origin location, layover locations, destination location, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with CMD 360, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect seat device 326 includes a display device 330, a processor 332, a memory 340, one or more light sensors 370, a seat device communication interface (also referred to as communication interface) 328 and a local storage device 342 for storing content. The seat device may optionally include a camera 337 and a microphone 336. The camera may be used to take pictures and videos and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options for users. The IFE layer 334 provides audio/video content as well as controls for accessing the content.

In one aspect, processor 332 executes instructions for the light control module 320 using the light data structure 368 to adjust display 330 brightness level, based on the light data collected by light sensor 370 of multiple seat devices 326. In another aspect, server 354 provides the light related information to the seat device 326 to adjust the brightness level of the display 330, as described below in detail.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 may also execute the application 314 that may be used by the passenger to view media content or various computing functions that are enabled by the seat device 326. Application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone (not shown) for receiving voice input. CMD 360 may also include a camera (not shown) for taking pictures or making a video. The CMD 360 may also include a storage device 324 that may include any storage medium for storing data in a non-volatile manner, such as one or more magnetic or optical based disks, flash memory, or solid-state drive. The storage device 316 may be used to store a device interface 318, may also be referred to as a "crew management interface (CMI)" 318 that may be executed out of memory 364.

The CMI 318 enables the CMD 360 to interface with the onboard management system 344 via a CMD communication module 366. The CMD 360 may present one or more APIs to the onboard management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In yet another aspect, CMD 360 stores the light control module 320 and a portion or the entirety of data structure 368 to send instructions to seat device 326 to adjust brightness levels based on data collected from a group of seat devices 326, as described below in detail.

In one aspect, the PED 302 is securely paired with the seat device 326. The term "pair" means that PED 302 is associated and authenticated by the seat device 326 and/or server 354 to send and receive information.

As an example, the PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving voice input from a passenger. The voice input can be converted into text by application 314 for processing. In another aspect, PED 302 also includes a camera 337 that may be used by a passenger to upload a video.

The PED 302 includes a storage device 316 that may be or may include any storage medium for storing data in a non-volatile manner, such as one or more magnetic or optical based disks, flash memory, or solid-state drive. The storage device 316 may be used to store content displayed on display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content from device 115, as well as to communicate with CMD 360.

As an example, application 314 may be made available for download and installation via a public repository such as that maintained respectively under the trademark GOOGLE PLAY by Google, Inc. and/or the APP STORE maintained by Apple Inc. (without derogation to any third party trademark rights). In addition, application 314 may be provided for download by an airline carrier on a website or from the onboard management system 344.

Figure 3B:
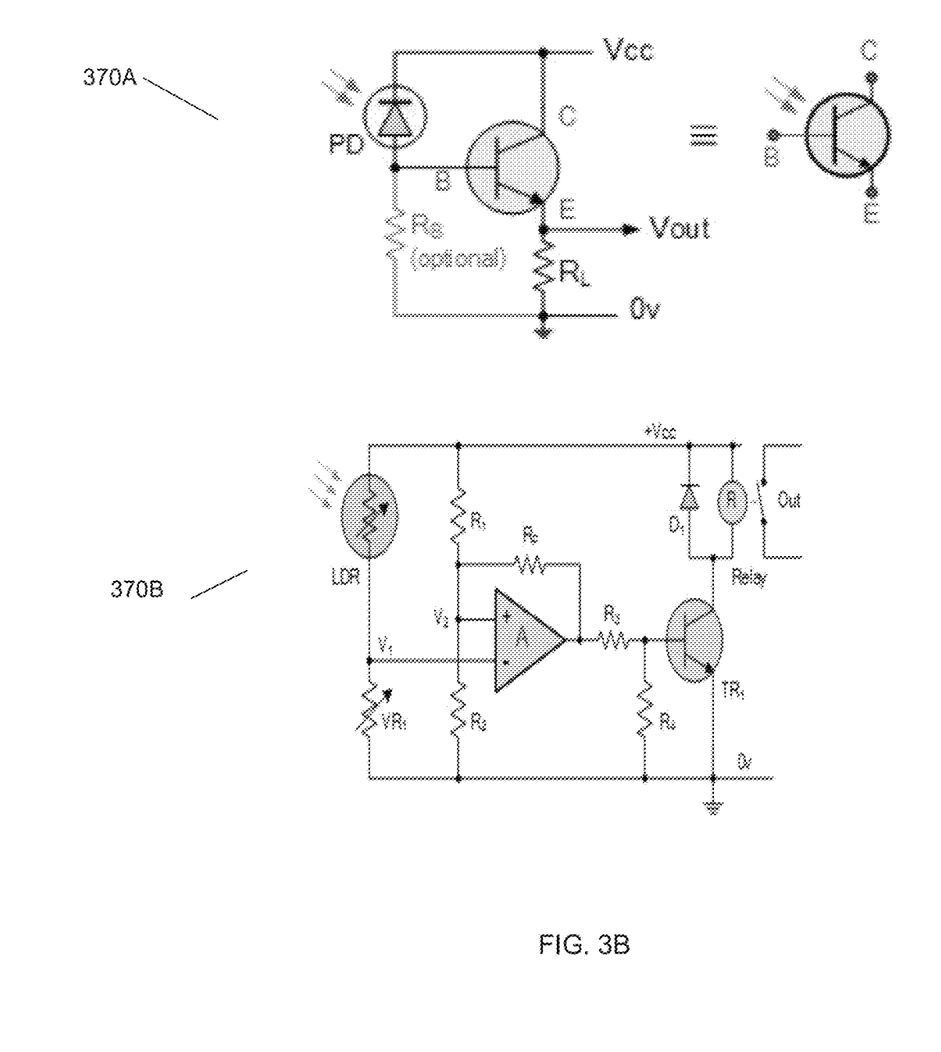
FIG. 3B shows an example of light sensors used by the system of FIG. 3A, according to one aspect of the present disclosure.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards. In one aspect, the Light Sensor(s) 370: FIG. 3B shows an example of different types of light sensors 370A and 370B. At a high level, light sensors are photoelectric devices that convert light energy (photons) whether visible or infrared light into an electrical signal. A light sensor generates an output signal indicating light intensity. The light sensor is typically a passive device that converts this light energy into an electrical signal output. Light sensors are commonly known as "Photoelectric Devices" or "Photo Sensors." As an example, circuitry for light sensors 370A and 370B is shown in FIG. 3B.

Light sensor 370A circuitry includes a photo-junction device referred to as a phototransistor, which is a photodiode with amplification. The phototransistor light sensor 370A has a reverse biased collector-base, PN-junction exposed to a light source. Phototransistors operate like a photodiode and also provide current gain. Phototransistors consist mainly of a bipolar NPN transistor and uses photons to generate a base current which in turn causes a collector to emit current flow.

Light sensor 370B circuitry uses a light dependent resistor (LDR) that changes its electrical resistance when light falls upon it by creating hole-electron pairs. In this sensing circuit, the LDR and a potentiometer VR1 form an adjustable arm of a simple resistance bridge network, with two fixed resistors R1 and R2. Both sides of the bridge form potential divider networks across the supply voltage whose outputs V1 and V2 are connected to the non-inverting and inverting voltage inputs respectively of an operational amplifier. The operational amplifier is configured as a differential amplifier also known as a voltage comparator with feedback whose output voltage condition is determined by the difference between the two input signals or voltages, V1 and V2. The resistor combination R1 and R2 form a fixed voltage reference at input V2, set by a ratio of the two resistors. The LDR-VR1 combination provides a variable voltage input V1 proportional to the light level being detected by the photoresistor.

The output from the operational amplifier is used to control a relay, which is protected by a free wheel diode, D1. When the light level sensed by the LDR and its output voltage falls below the reference voltage set at V2, the output from the operational amplifier changes state activating the relay and switching the connected load. Similarly, as the light level increases the output turns "OFF" the relay. The operation of light sensor circuit 370B can be reversed to switch the relay "ON" when the light level exceeds the reference voltage level and vice versa by reversing the positions of the LDR and the potentiometer VR1. The potentiometer can be used to "pre-set" a switching point of the differential amplifier to any light level.

It is noteworthy that 370A and 370B are only examples of light sensor 370 and are not intended to limit the various adaptive aspects of the present disclosure to any specific light sensor circuitry.

Figure 3C:
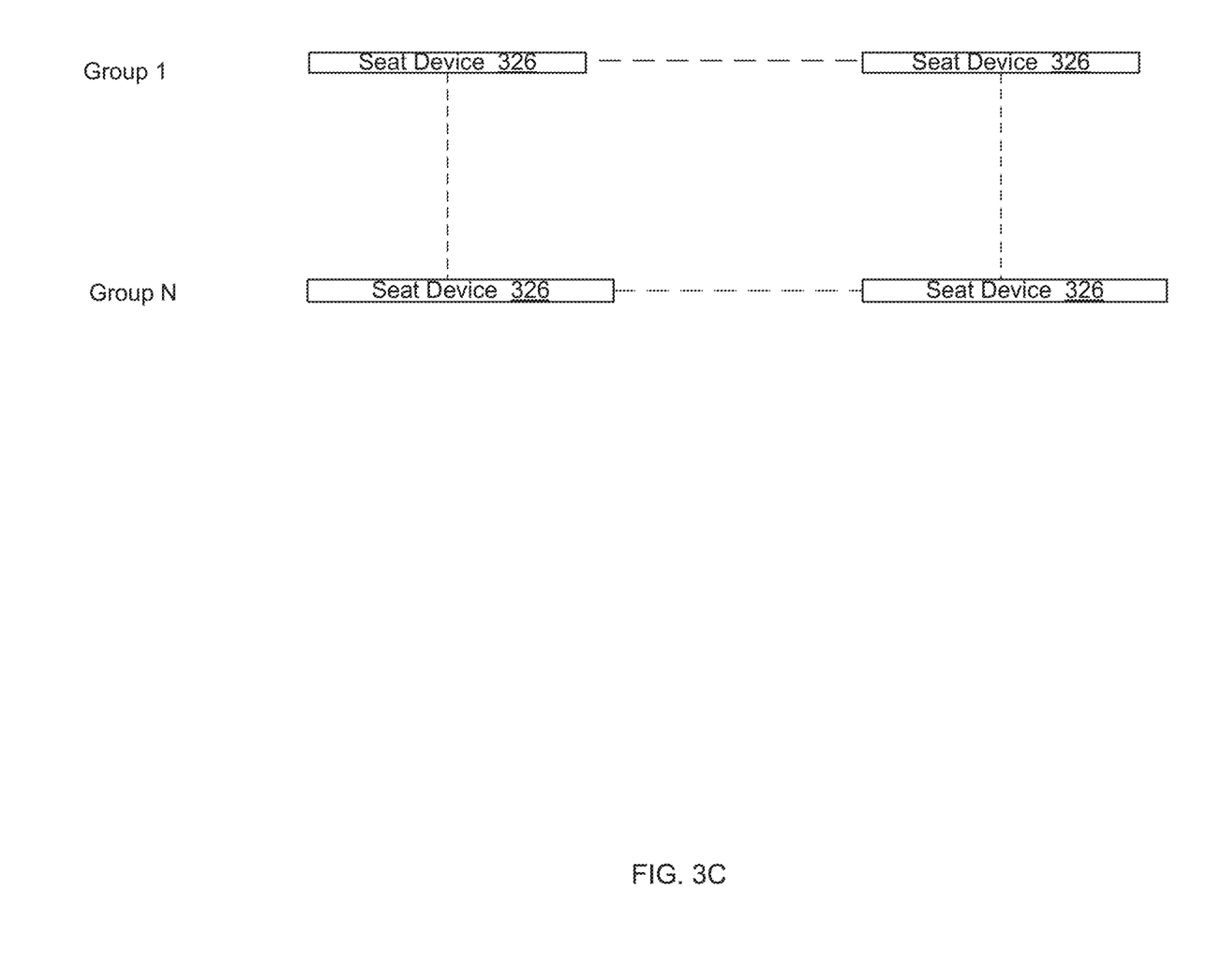
FIG. 3C show an example of grouping light sensors used by the system of FIG. 3A, according to one aspect of the present disclosure.
Figure 3D:
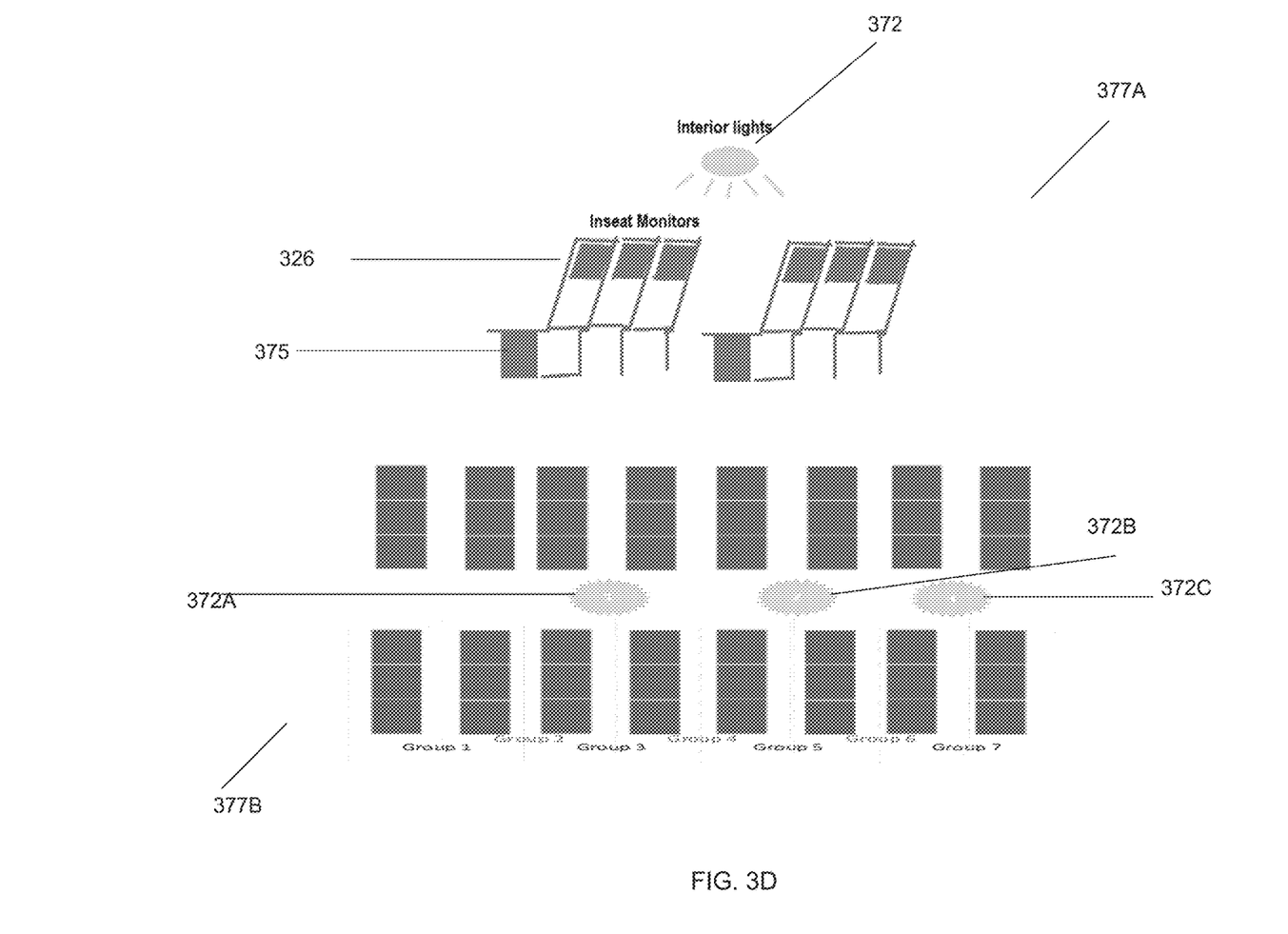
FIG. 3D shows another example of grouping light sensors used by the system of FIG. 3A, according to one aspect of the present disclosure.

Seat Device Grouping: FIG. 3C shows an example of grouping seat devices into group 1-N. FIG. 3D shows a first example 377A of monitor grouping with interior light 372, seat monitors (or devices) 326 and passenger seats 375. FIG. 3D also shows a second example with groups 1-7 with cabin interior lights 372A-372C.

Figure 3E:
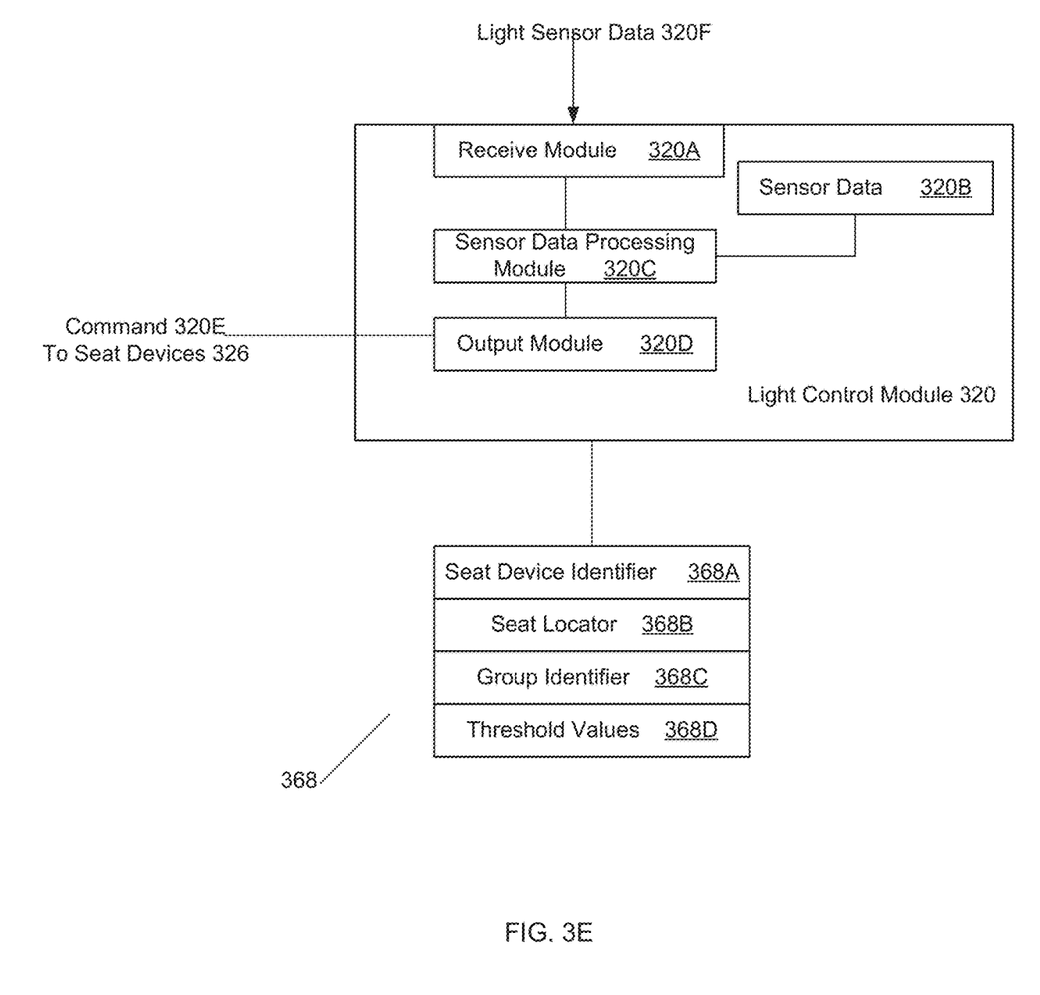
FIG. 3E shows an example of a light control module and a light data structure, according to one aspect of the present disclosure.

Light Control Module 320 (or module 320): FIG. 3E shows an example of the light control module 320, according to one aspect of the present disclosure. Light control module 320 includes a receive module 320A that periodically receives light sensor data 320F from a plurality of light sensors 370 from each seat device 326. The light data may include the luminous flux measured in lumens and luminous intensity measured in candelas. The light control module 320 includes a sensor data processing module 320C (also referred to as module 320C) that maintains a running average of each seat device's light sensor data, shown as sensor data 320B. Module 320C determines a group's average light sensor data and compares the average against a previous duration (e.g., without limitation, 10 seconds earlier). If value has increased beyond or equal to a first threshold level, then an increase is noted. If value has decreased, compared to a second threshold value, then a decrease is noted. The increased or decreased value is compared with other groups average light sensor data. If X number (e.g., 3) consecutive groups report the same changes, then the change is captured and noted to indicate the state of the ambient light. The decrease indicates a low light ambience mode, while the increase indicates a high light ambience mode. Based on the ambient light condition, the light control module determines a "Bright/daytime," "Dark/nighttime" or another light condition. Based on the light condition a command 320E is generated by an output module 320D that is sent to each seat device within one or more groups to adjust their brightness level.

FIG. 3D also shows the data structure 368 for enabling automated light control in an aircraft cabin by the light control module 320. Data structure 368 stores a seat identifier 368A for each seat device and a seat locator 368B. The seat locator 368B is based on an aircraft layout of aircraft accommodations ("LOPA") that can vary for different aircrafts. Data structure 368 further stores group identifiers 368C, as shown in FIG. 3D. The data structure 368 may also store threshold values 368D that define a change in lighting conditions, e.g., from bright to dark or dark to bright.

Figure 4:
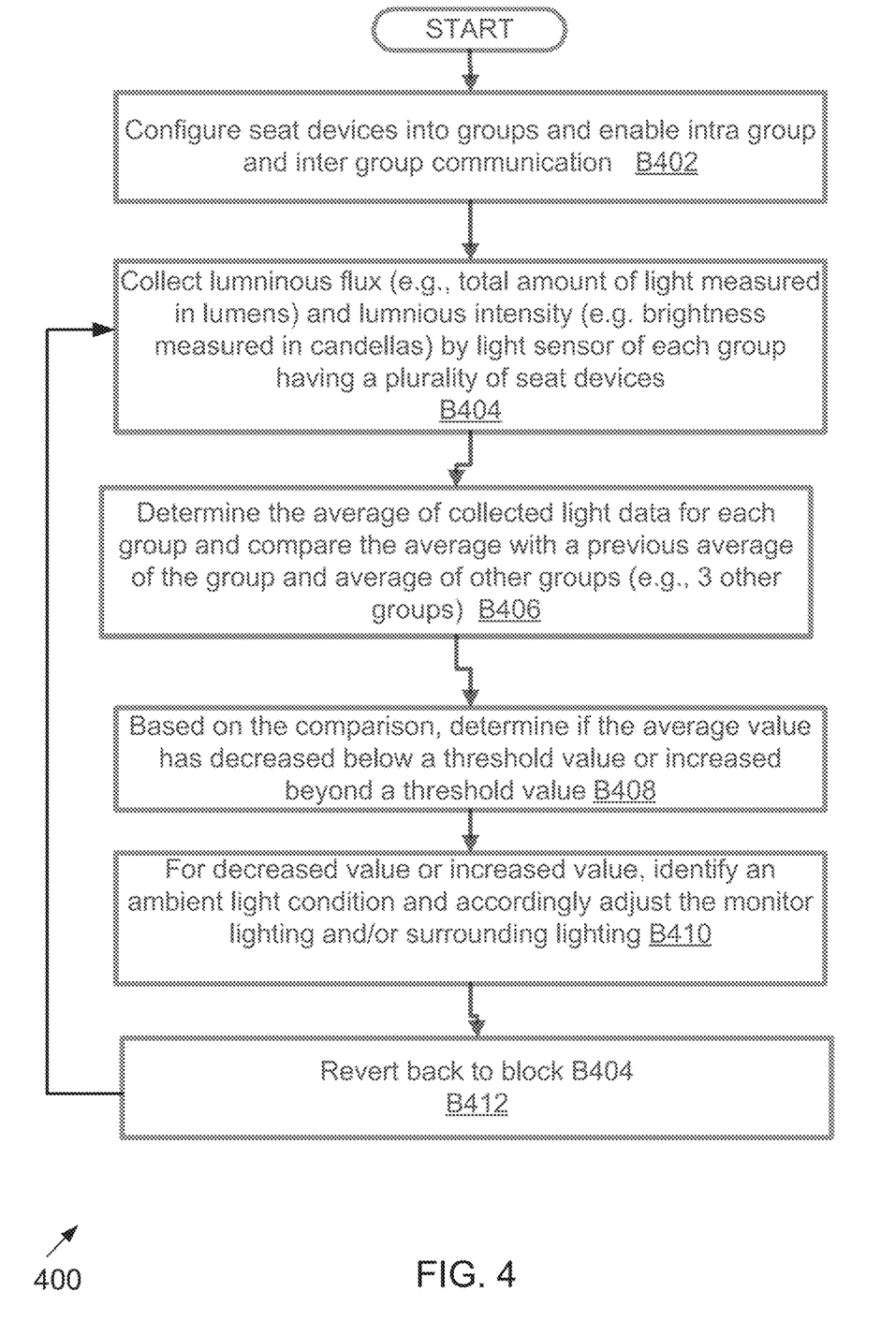
FIG. 4 shows a process flow diagram for using a plurality of light sensors of an IFE system, according to one aspect of the present disclosure.

Process Flow: FIG. 4 shows a process 400 for managing seat device lighting using light sensor data from multiple seat devices 326, according to one aspect of the present disclosure. Process 400 is executed by the light control module 320 using data structure 368. As mentioned above the light control module 320 may be executed in server 354, seat device 326 and/or CMD 360. When executed by a seat device 326 that is part of a group, then the seat device is configured as a "master" device within the group. In this configuration, the master seat device receives light sensor data from the other group members.

Process 400 begins in block B402, when the various seat devices 326 are configured into groups, as shown in FIG. 3D. The seat devices within each group can communicate with each other as well as with seat devices of other groups using the network infrastructure of the aircraft, described above with respect to FIG. 2. As an example, the groups are configured based on geographical proximity of the seat devices as indicated by the LOPA.

In block B404, luminous flux and luminous intensity data (e.g., 320F, FIG. 3E) from each light sensor 370 of a seat device of each group is collected. In block B406, the average of each group's light data is determined by the light control module 320. The average of each group is first compared to a previous average of the same group, if applicable (e.g., data collected 10 seconds prior to the current time). The average may also be compared to the average of other nearby groups (e.g., 3 other groups).

Based on the comparison, in block B408, module 320 determines if the average value has decreased or increased by a threshold value (e.g., 368D). In response to the decrease or increase, an ambient light condition (e.g., bright, dark or any other condition) is identified. In response to the ambient light condition, a command (e.g., 320E) is generated in block B410 to adjust seat device 326 monitor lighting. Thereafter in block B412, the process reverts to block B404.

Process 400 has various advantage, for example, process 400 enables a centralized control for the cabin light, reduces light disruption to passengers' and may also help to reduce passenger eye strain by automatically reducing/increasing brightness level of seat devices based on measured cabin light. This removes conventional static schedule/manual light control methodology that is used by conventional system, prior to this disclosure.

In one aspect, methods and systems are provided for a transportation vehicle (e.g., an aircraft). One method includes: configuring (e.g., B402, FIG. 4) a plurality of groups (e.g., groups 1-7, FIG. 3D) on a transportation vehicle, each group comprising a plurality of seat devices (e.g., 326, FIG. 3A) with a display monitor (e.g., 330, FIG. 3A); obtaining (e.g., B404, FIG. 4) light sensor data for a first group captured by one or more light sensor (e.g., 370, FIG. 3A) at each seat device of the first group; computing (e.g., B406, FIG. 4) an average of the light sensor data of the first group; comparing (e.g., B406, FIG. 4) the computed average with a previous average of the light sensor data of the first group; determining (e.g., B408, FIG. 4) that the computed average of the light sensor data of the first group is different from the previous average by a threshold value (e.g., 368D, FIG. 3E); confirming (B408, FIG. 4) that the computed average of the light sensor data of the first group has changed similar to a change in an average of light sensor data of a second group; identifying (e.g., B410, FIG. 4) a change in an ambient light condition based on a difference between the computed average and the previous average of the light sensor data of the first group and comparison of the computed average with the average of the light sensor data of the second group; and automatically adjusting a brightness level of the seat devices of the first group, in response to the change in the ambient light condition.

Figure 5:
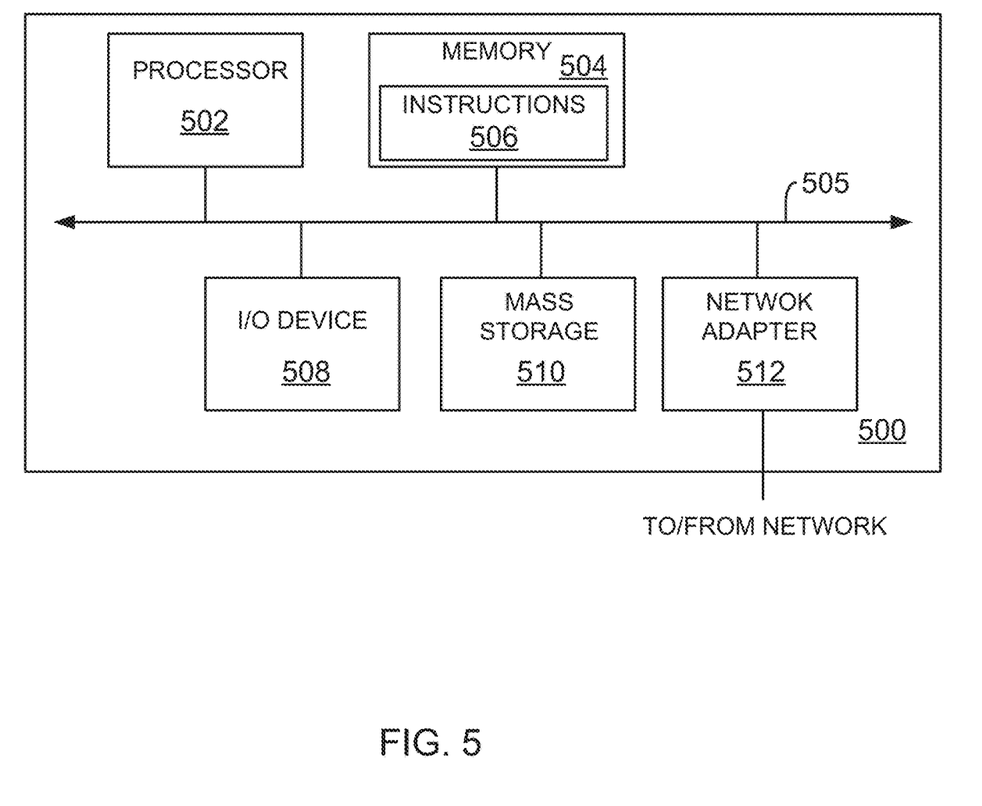
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to the process steps of FIG. 4 executed by module 320 as well as the data structure 368, described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing monitor brightness level on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
    configuring a plurality of groups on a transportation vehicle, each group comprising a plurality of seat devices with a display monitor;
    obtaining light sensor data for a first group captured by one or more light sensors at each seat device of the first group;
    computing an average of the light sensor data of the first group;
    comparing the computed average with a previous average of the light sensor data of the first group;
    determining that the computed average of the light sensor data of the first group is different from the previous average by a threshold value;
    confirming that the computed average of the light sensor data of the first group has changed similar to a change in an average of light sensor data of a second group;
    identifying a change in an ambient light condition based on a difference between the computed average and the previous average of the light sensor data of the first group and comparison of the computed average with the average of the light sensor data of the second group; and
    automatically adjusting brightness level of the seat devices of the first group, in response to the change in the ambient light condition.

2. The method of claim 1, wherein the change in ambient light condition indicates a dark condition when the computed average of the light sensor data of the first group has decreased by the threshold value and the brightness level of each seat device is increased in response to the dark condition.

3. The method of claim 1, wherein the change in ambient light condition indicates a bright condition when the computed average of the light sensor data of the first group has increased by the threshold value and the brightness level of each seat device is decreased in response to the bright condition.

4. The method of claim 1, wherein the light sensor data captured by the one or more light sensor of each seat device of the first group includes luminous flux and light intensity.

5. The method of claim 1, further comprising:
    comparing the computed average of the light sensor data of the first group with an average light sensor data of more than one group to confirm a change in the ambient light condition.

6. The method of claim 1, wherein the transportation vehicle is an aircraft.

7. The method of claim 1, wherein the transportation vehicle is a non-aircraft.

8. A non-transitory machine-readable storage medium having stored thereon instructions for performing a method, comprising machine executable code which when executed by at least one machine, causes the machine to:
    configure a plurality of groups on a transportation vehicle, each group comprising a plurality of seat devices with a display monitor;
    obtain light sensor data for a first group captured by one or more light sensors at each seat device of the first group;
    compute an average of the light sensor data of the first group;
    compare the computed average with a previous average of the light sensor data of the first group;
    determine that the computed average of the light sensor data of the first group is different from the previous average by a threshold value;
    confirm that the computed average of the light sensor data of the first group has changed similar to a change in an average of light sensor data of a second group;
    identify a change in an ambient light condition based on a difference between the computed average and the previous average of the light sensor data of the first group and comparison of the computed average with the average of the light sensor data of the second group; and
    automatically adjust brightness level of the seat devices of the first group, in response to the change in the ambient light condition.

9. The non-transitory machine-readable storage medium of claim 8, wherein the change in ambient light condition indicates a dark condition when the computed average of the light sensor data of the first group has decreased by the threshold value and the brightness level of each seat device is increased in response to the dark condition.

10. The non-transitory machine-readable storage medium of claim 8, wherein the change in ambient light condition indicates a bright condition when the computed average of the light sensor data of the first group has increased by the threshold value and the brightness level of each seat device is decreased in response to the bright condition.

11. The non-transitory machine-readable storage medium of claim 8, wherein the light sensor data captured by the one or more light sensor of each seat device of the first group includes luminous flux and light intensity.

12. The non-transitory machine-readable storage medium of claim 8, wherein the machine executable code which when executed by at least one machine, further causes the machine to: compare the computed average of the light sensor data of the first group with an average light sensor data of more than one group to confirm a change in the ambient light condition.

13. The non-transitory machine-readable storage medium of claim 8, wherein the transportation vehicle is an aircraft.

14. The non-transitory machine-readable storage medium of claim 8, wherein the transportation vehicle is a non-aircraft.

15. A system, comprising:
    a memory containing machine readable medium comprising machine executable code having stored thereon instructions; and a processor coupled to the memory to execute the machine executable code to:
    configure a plurality of groups on a transportation vehicle, each group comprising a plurality of seat devices with a display monitor;
    obtain light sensor data for a first group captured by one or more light sensor at each seat device of the first group;
    compute an average of the light sensor data of the first group;
    compare the computed average with a previous average of the light sensor data of the first group;
    determine that the computed average of the light sensor data of the first group is different from the previous average by a threshold value;
    confirm that the computed average of the light sensor data of the first group has changed similar to a change in an average of light sensor data of a second group;
    identify a change in an ambient light condition based on a difference between the computed average and the previous average of the light sensor data of the first group and comparison of the computed average with the average of the light sensor data of the second group; and automatically adjust brightness level of the seat devices of the first group, in response to the change in the ambient light condition.

16. The system of claim 15, wherein the change in ambient light condition indicates a dark condition when the computed average of the light sensor data of the first group has decreased by the threshold value and the brightness level of each seat device is increased in response to the dark condition.

17. The system of claim 15, wherein the change in ambient light condition indicates a bright condition when the computed average of the light sensor data of the first group has increased by the threshold value and the brightness level of each seat device is decreased in response to the bright condition.

18. The system of claim 15, wherein the light sensor data captured by the one or more light sensor of each seat device of the first group includes luminous flux and light intensity.

19. The system of claim 15, wherein the transportation vehicle is an aircraft.

20. The system of claim 15, wherein the transportation vehicle is a non-aircraft.

* * * * *